(12) United States Patent
Hart et al.

(10) Patent No.: US 8,500,523 B1
(45) Date of Patent: Aug. 6, 2013

(54) CUTTING SYSTEM AND METHOD OF CUTTING MEAT PARTS USING THE SAME

(75) Inventors: Colin R. Hart, Ankeny, IA (US); Doug Bauer, Altoona, IA (US)

(73) Assignee: Marel Meat Processing Inc., Des Moines, IA (US)

( * ) Notice: Subject to any disclaimer, the term of this patent is extended or adjusted under 35 U.S.C. 154(b) by 0 days.

(21) Appl. No.: 13/490,762

(22) Filed: Jun. 7, 2012

(51) Int. Cl.
*A22C 18/00* (2006.01)

(52) U.S. Cl.
USPC .......................................................... 452/154

(58) Field of Classification Search
USPC .................. 452/136, 148–158, 160, 166, 170
See application file for complete search history.

(56) References Cited

U.S. PATENT DOCUMENTS

| | | | |
|---|---|---|---|
| 5,176,563 A | 1/1993 | Van den Nieuwelaar et al. | |
| 5,205,779 A * | 4/1993 | O'Brien et al. | 452/157 |
| 5,324,228 A * | 6/1994 | Vogeley, Jr. | 452/158 |
| 5,902,177 A * | 5/1999 | Tessier et al. | 452/156 |
| 6,860,804 B2 * | 3/2005 | Kruger | 452/157 |
| 7,153,203 B2 * | 12/2006 | Pfarr et al. | 452/150 |
| 7,214,129 B2 * | 5/2007 | Couture et al. | 452/171 |
| 7,662,034 B2 | 2/2010 | Van Hillo et al. | |
| 8,028,497 B2 * | 10/2011 | Griggs et al. | 53/138.4 |
| 8,096,860 B2 * | 1/2012 | Bolte et al. | 452/157 |
| 8,292,702 B2 * | 10/2012 | Bolte et al. | 452/134 |
| 2005/0159094 A1 | 7/2005 | Dunivan | |

* cited by examiner

*Primary Examiner* — Richard Price, Jr.
(74) *Attorney, Agent, or Firm* — Zarley Law Firm, P.L.C

(57) ABSTRACT

A cutting system that conveys a meat product to the throat and blade of a saw. A positioning conveyor positions the meat product into a predetermined position. An adjustable laser is then used to locate a predetermined area of the meat product so that the saw blade can be adjusted to align with the laser beam before cutting of the meat product.

14 Claims, 5 Drawing Sheets

CUTTING SYSTEM AND METHOD OF CUTTING MEAT PARTS USING THE SAME

BACKGROUND OF THE INVENTION

This invention relates to meat processing machines. More specifically this invention relates to a cutting system and a method of cutting meat using the same.

Meat cutting systems have been around for many years. One example is a system utilized to separate the butt from the picnic cut of meat. In this system the shoulder is hung on a shackle on a transport conveyor that transports the shoulder to a positioning conveyor. The positioning conveyor then utilizes a hook to rotate the leg into a predetermined position and the leg is conveyed to the throat of a stationary saw. Specifically the shoulder is positioned to attempt to align using the (Brachial) vein of the leg that runs between the shoulder and leg bone as a reference point with the blade of the saw such that when the shoulder is conveyed through the throat, the blade cleanly cuts the butt from the picnic at the most opportune position.

In current practice the operator is unable to properly align the blade of the saw with the optimal cut line using the vein of the leg to provide the exact cut as needed on the horizontal conveyor. As a result an inconsistent cut occurs. Sometimes this results in a portion of the humerus bone being included with the butt. In other instances much of the butt is left on the picnic after the cut, decreasing the yield of the pork from the cutting process.

In an attempt to improve the yield and provide a more consistent cut, manufacturers have begun using lasers to assist in the cutting process. In particular, machine operators attempt to use stationary lasers to manually position the vein of the leg as compared to the blade of the saw. Using the laser as a guide, workers physically move the shoulder to align the vein with the blade. While an improvement, obvious problems still remain. Having a person manually align the shoulder is susceptible to human error and human injury. Thus, yield is still lost or a portion of the humerus bone is included with the butt.

Therefore, a principal objective of the present invention is to provide a cutting system that will maximize the yield of meat cut from a meat product.

Yet another object of the present invention is to improve worker safety.

These and other objects, features, and advantages will become apparent from the rest of the specification and claims.

BRIEF SUMMARY OF THE INVENTION

A cutting system having a positioning conveyor that places a meat product in a predetermined location. A cutting apparatus is provided that has a saw body with a throat and a blade both that receive the meat product. An adjustable laser is provided that shines a laser beam on the meat product approaching the throat and blade and can adjust to shine at a predetermined location on the meat product. The cutting system then has an adjustment system that moves the saw body to align the blade with the predetermined location on the meat product.

DETAILED DESCRIPTION OF THE PREFERRED EMBODIMENT

Figure 1:
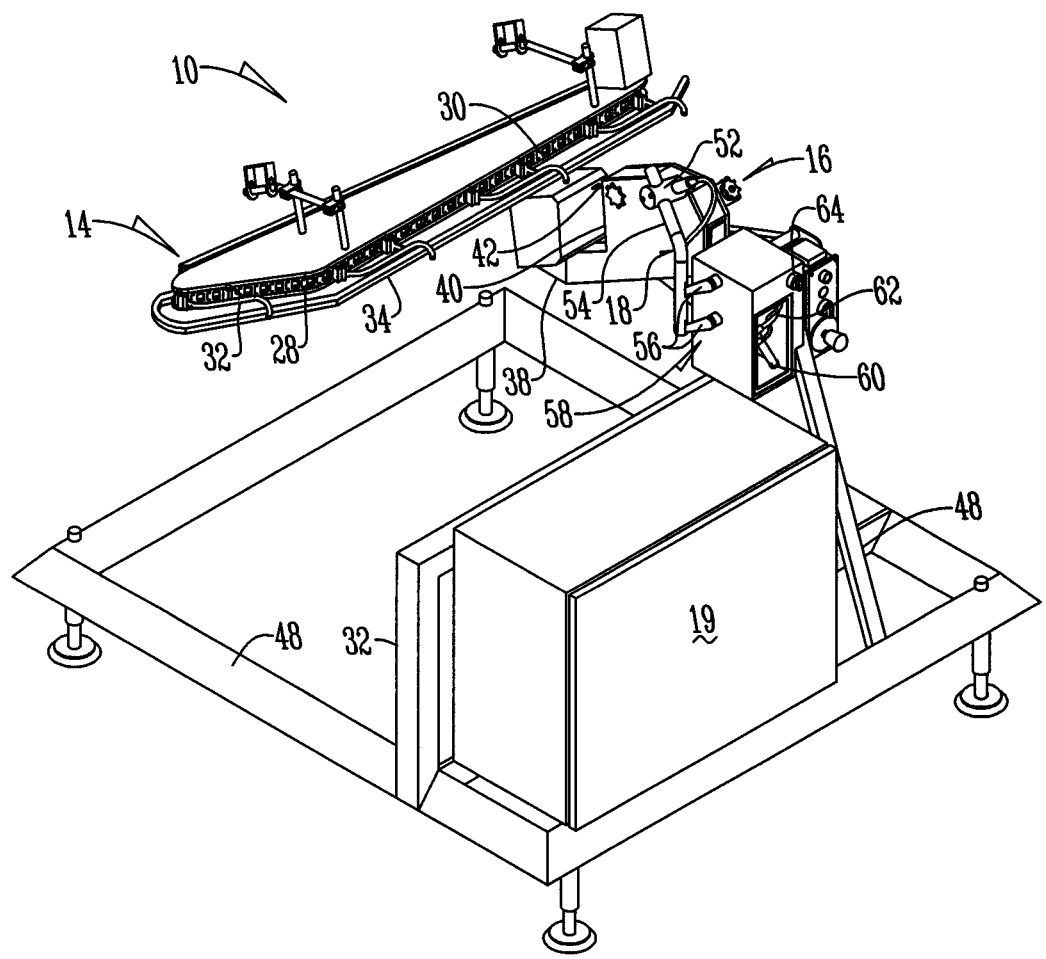
FIG. 1 is a perspective view of a cutting system.
Figure 2:
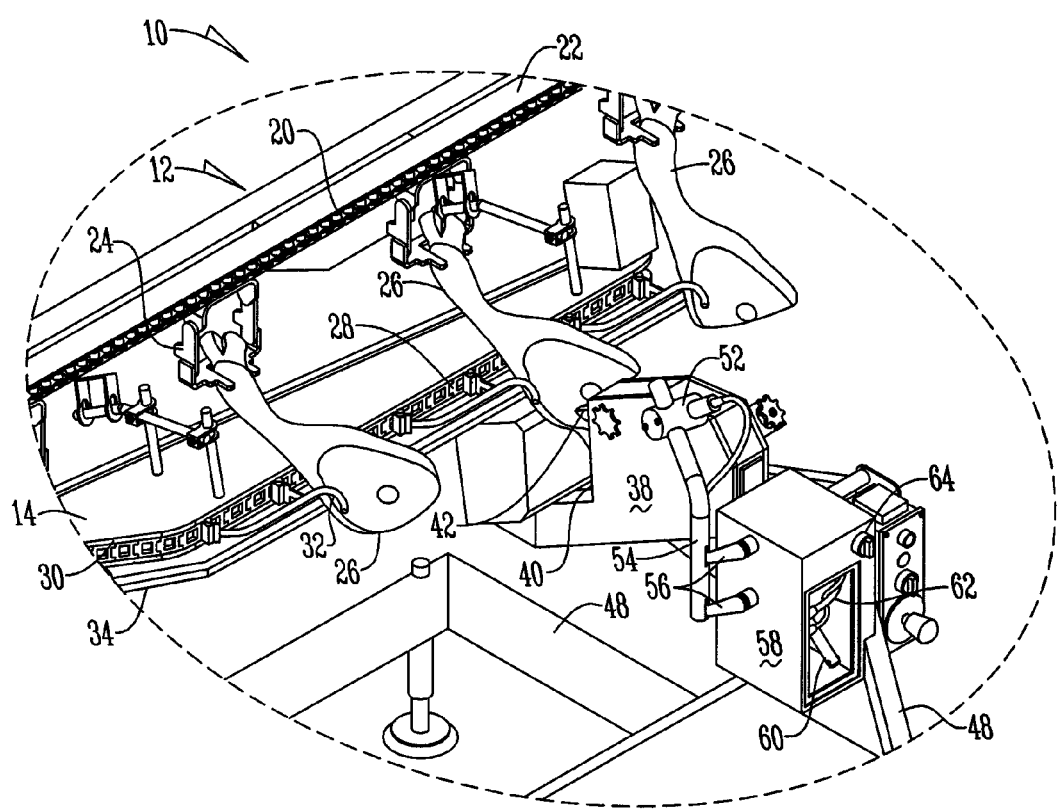
FIG. 2 is a perspective view of a cutting system.
Figure 3:
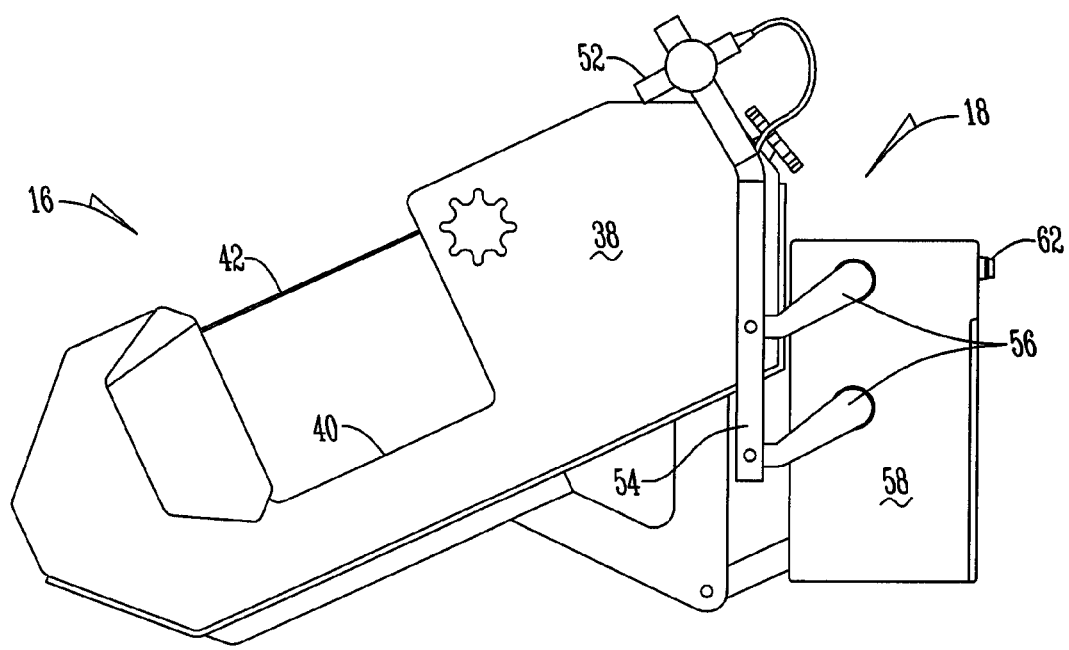
FIG. 3 is a side view of a cutting system.
Figure 4:
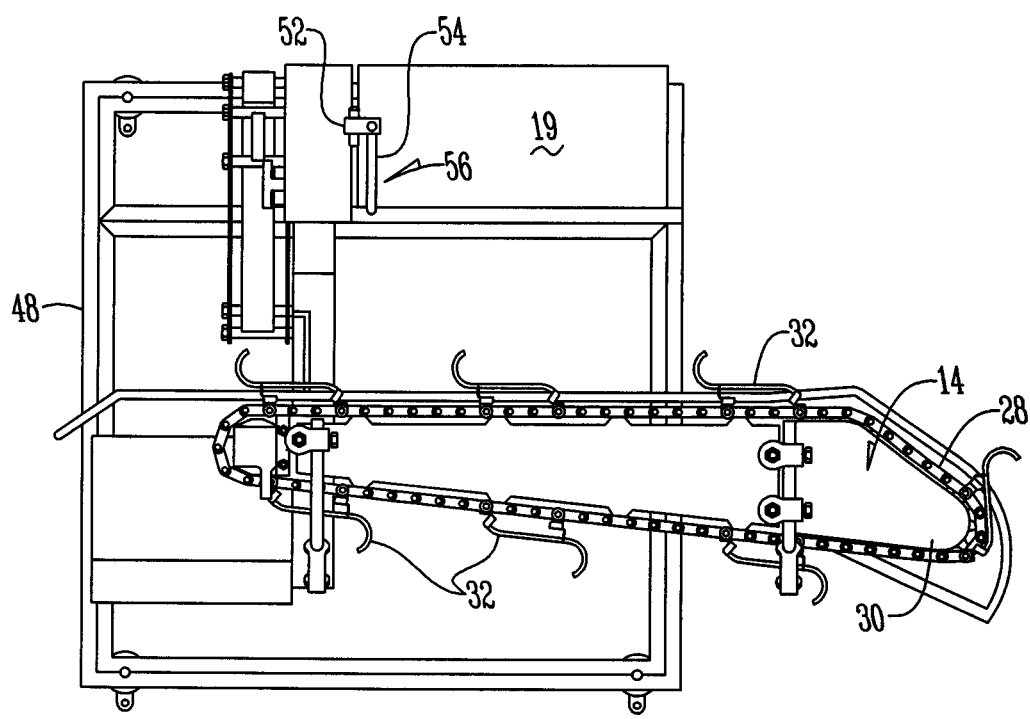
FIG. 4 is a top plan view of a cutting system.
Figure 5:
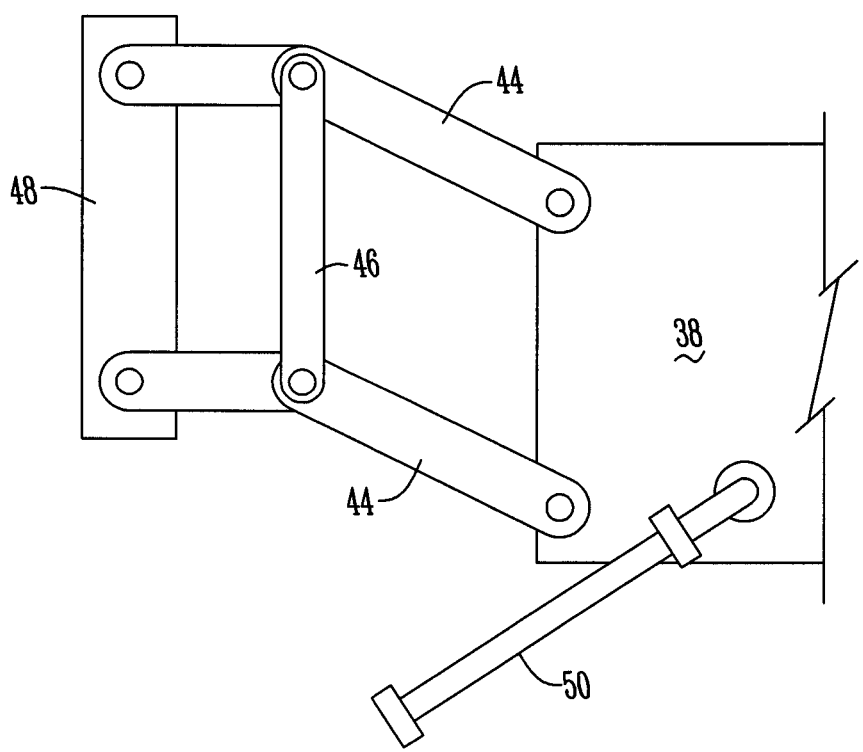
FIG. 5 is a partial side view of a cutting system.

Referring to the figures, a cutting system 10 includes a transport conveyor 12, a positioning conveyor 14, an adjustable cutting assembly 16, an adjustable laser assembly 18, and a controller 19. The transport conveyor 12 extends longitudinally above the floor and preferably includes a continuous chain 20 slidably mounted to a track 22. A plurality of shackles 24 are attached to the chain 20 and are used to secure a meat product 26 to the transport conveyor 12.

The positioning conveyor 14 is positioned below and in spaced alignment with a portion of the transporting conveyor 12. Preferably the positioning conveyor 14 is set at a 30 degree angle in relation to the floor and has a continuous chain 28 slidably mounted to a track 30, a plurality of flights 32 connected to the chain, and a guide bar 34 positioned in spaced relation to a portion of the chain 28 to, in part, prevent the meat product 26 from engaging the chain 28.

The adjustable cutting assembly 16 is positioned adjacent the positioning conveyor 14 so as to receive the meat product 26 for cutting. The assembly 16 includes a housing 38 that has a throat section/opening 40. Disposed within and secured to the housing 38 is a saw (not shown) with a saw blade 42 that extends out of the housing 38 and across the upper portion of the throat 40. Rotatably connected to the housing 38 are a pair of links 44 that are rotatably connected to a bracket 46 secured to a frame 48. Disposed within the control box 58 is a linear actuator 62 that is connected to the link arms 44 in a manner that causes the link arms 44 to rotate as the linear actuator 62 extends and retracts. A pneumatic cylinder 50 is secured to the frame 48 at one end and the housing 38. This cylinder 50 is used to assist the raising of the cutting assembly 16.

The adjustable laser assembly 18 is positioned adjacent the cutting assembly 16 and includes a laser beam emitting device 52 connected to a support member 54. Rotatably attached to the support member 54 are a pair of link arms 56 that are rotatably connected to a control box 58. Disposed within the control box 58 is a linear actuator 60 that is connected to the link arms 56 in a manner that causes the link arms 56 to rotate as the linear actuator 60 extends and retracts.

In operation, the transport assembly 12 delivers a meat product 26 to a positioning assembly 14. As the meat product 26 engages the flight 32 and guide bar 34, the product 26 is advanced forward of shackle 24 and maintained in a desired position for cutting. The positioning conveyor 14 runs at a speed synchronous to the transport conveyor 12. As the product 26 moves along the positioning conveyor 14 toward the cutting assembly 16 an operator positions the beam of the laser device 52 such that the beam aligns with the desired cut line of the meat product 26. This is done by using the selector switch 64 to extend or retract actuator 60. The position of actuator 60 is sent to the controller 19. The controller 19 sends a signal to the linear actuator 62. The actuator 62 extends or retracts to match the position of actuator 60. Therefore, the cutting assembly 16 is raised or lowered to match the position of the laser device 52 which aligns the blade 42 with the desired cut line.

Once adjusted, the positioning conveyor 14 and transport conveyor 12 deliver the meat product 26 to the throat 40 of the cutting assembly 16 where the blade 42 cuts the meat product 26 along the desired cut line. As the meat product 26 exits the cutting assembly, the cut portion of the meat product drops to a conveyor or hopper and the attached portion is transported away for further processing. In a preferred embodiment, the meat product 26 is transported at a speed of six inches per second and the meat products are spaced at intervals of eighteen inches. This allows three seconds for an operator to make the needed adjustments.

Thus provided is a cutting system 10 that uses a laser 52 to adjust the position of a cutting assembly 16 before cutting. By using the system 10, uniform cuts are provided causing more yield than previous systems and methods. In addition, an operator can control the system from the selector switch 64 without having to manually move the meat product thus improving safety. Thus at the very least all of the stated objectives have been met.

What is claimed is:

1. A cutting system comprising:
   a positioning conveyor that conveys a meat product at a predetermined position;
   a cutting assembly having a saw body with a throat and a blade therein, said cutting assembly positioned adjacent the positioning conveyor such that the meat product is conveyed at least partially through the throat to come in contact with the blade;
   a laser assembly adjacent the cutting assembly and having an adjustable laser positioned to place a laser beam on the meat product prior to conveying the meat product through the throat to determine a cutting line wherein the cutting assembly is adjustable so that the blade aligns with the determined cut line as the meat product is transported through the throat.

2. The cutting system of claim 1 further comprising a controller connected to the cutting assembly and the laser assembly wherein the controller automatically adjusts the position of the cutting assembly based upon the determined cut line.

3. The cutting system of claim 1 wherein the laser assembly is connected to a control box by a pair of link arms.

4. The cutting system of claim 1 wherein the cutting assembly has a housing connected to a pair of link arms.

5. A method of cutting a meat part comprising:
   conveying a meat product with a positioning conveyor toward a throat of a saw body having a blade;
   generating a laser beam with a laser that shines on the meat product;
   adjusting the position of the laser to shine the laser beam at a desired position on the meat product to determine a cut line;
   adjusting the position of the blade based on the height of the laser beam; and
   cutting the meat product after adjusting the position of the blade.

6. The method of claim 5 wherein the determined cut line of the meat product is a brachial vein.

7. The method of claim 5 wherein the meat product is a pork shoulder.

8. A cutting system, comprising:
   a transport conveyor that extends longitudinally above a floor having a plurality of shackles;
   a meat product that is secured to the shackle;
   a positioning conveyor positioned below and in spaced alignment with a portion of the transport conveyor;
   an adjustable cutting assembly positioned adjacent the positioning conveyor so as to receive the meat product for cutting; and
   an adjustable laser assembly positioned adjacent the adjustable cutting assembly and having a laser beam emitting device.

9. The system of claim 8 wherein the transport conveyor has a continuous chain slidably mounted to a track.

10. The system of claim 8 wherein the positioning conveyor has a continuous chain slidably mounted to a track, a plurality of flights connected to the chain, and a guide bar positioned in spaced relation to a portion of the chain.

11. The system of claim 8 wherein the positioning conveyor is set at a 30 degree angle in relation to the floor.

12. The system of claim 8 wherein the positioning conveyor runs at a speed synchronous to the transport conveyor.

13. The system of claim 8 wherein as the transport assembly delivers the meat product to the positioning conveyor, the meat product engages one of the plurality of flights so that the food product is advanced forward of the shackle.

14. The system of claim 8 wherein as the food product moves along the positioning conveyor toward the cutting assembly, a beam of the laser device is aligned with a desired cut line of the food product.

* * * * *